Aug. 26, 1952  H. HANSEN ET AL  2,608,322
FUR SHAPING TABLE
Filed Nov. 9, 1950  4 Sheets-Sheet 4
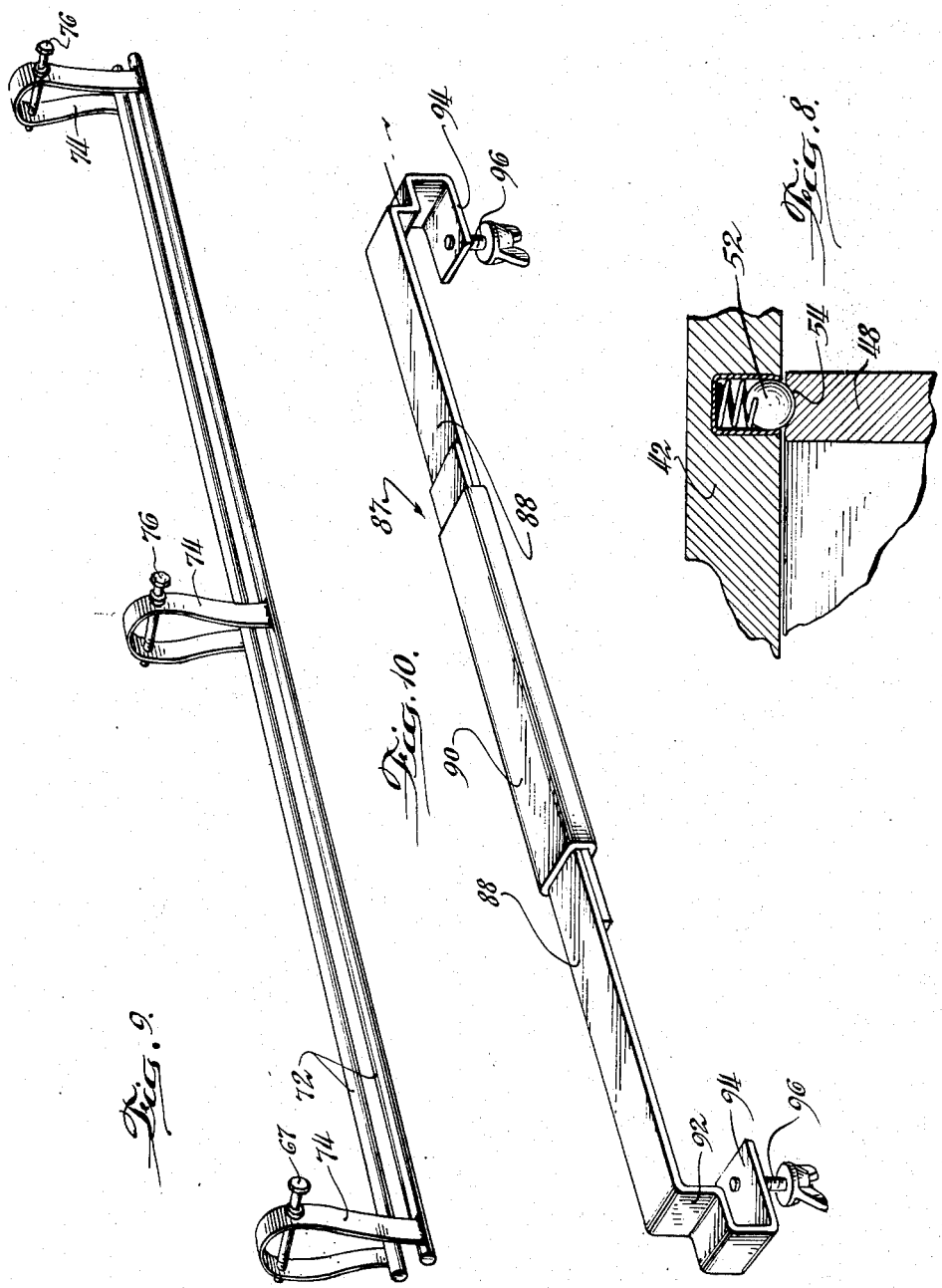

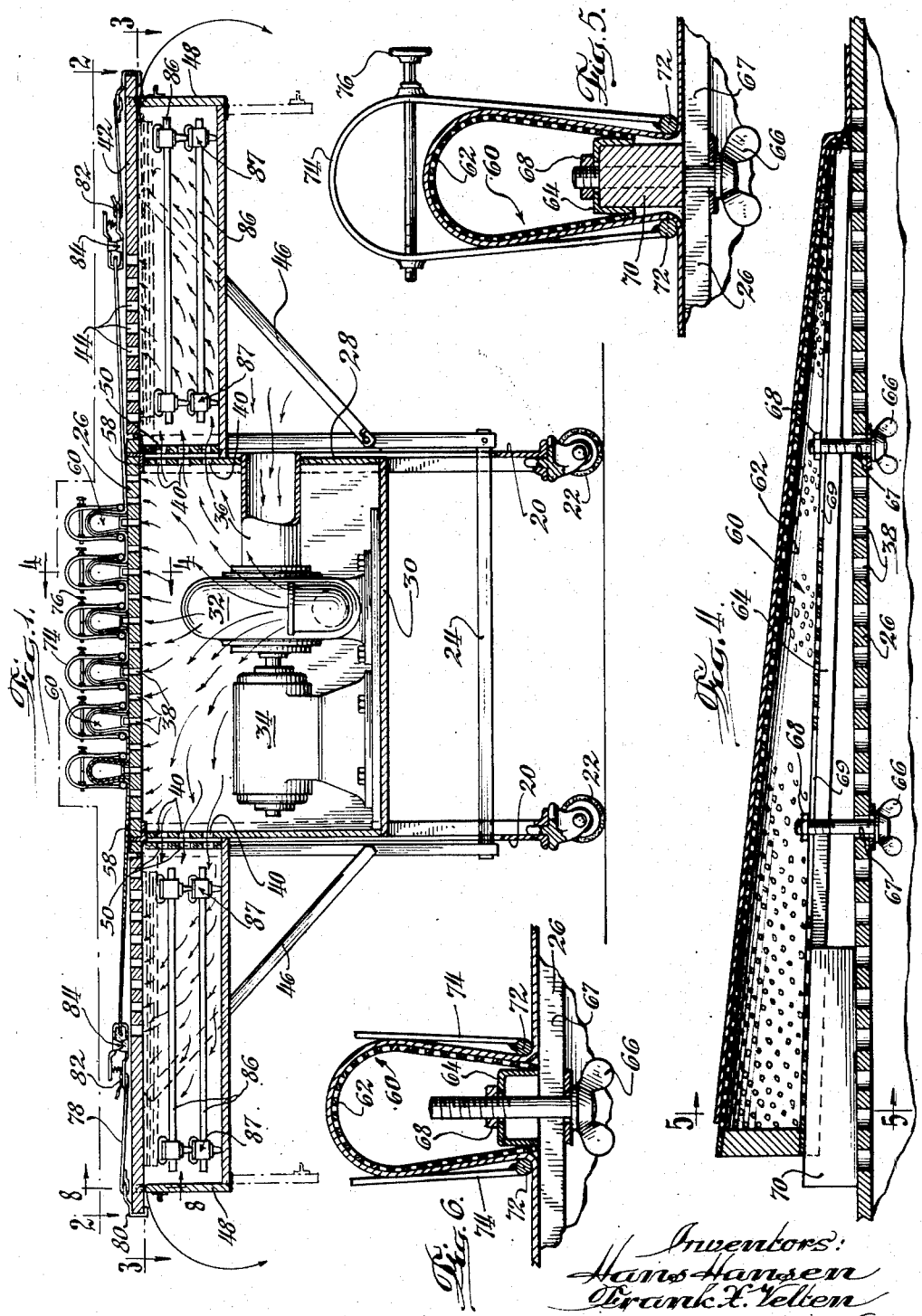

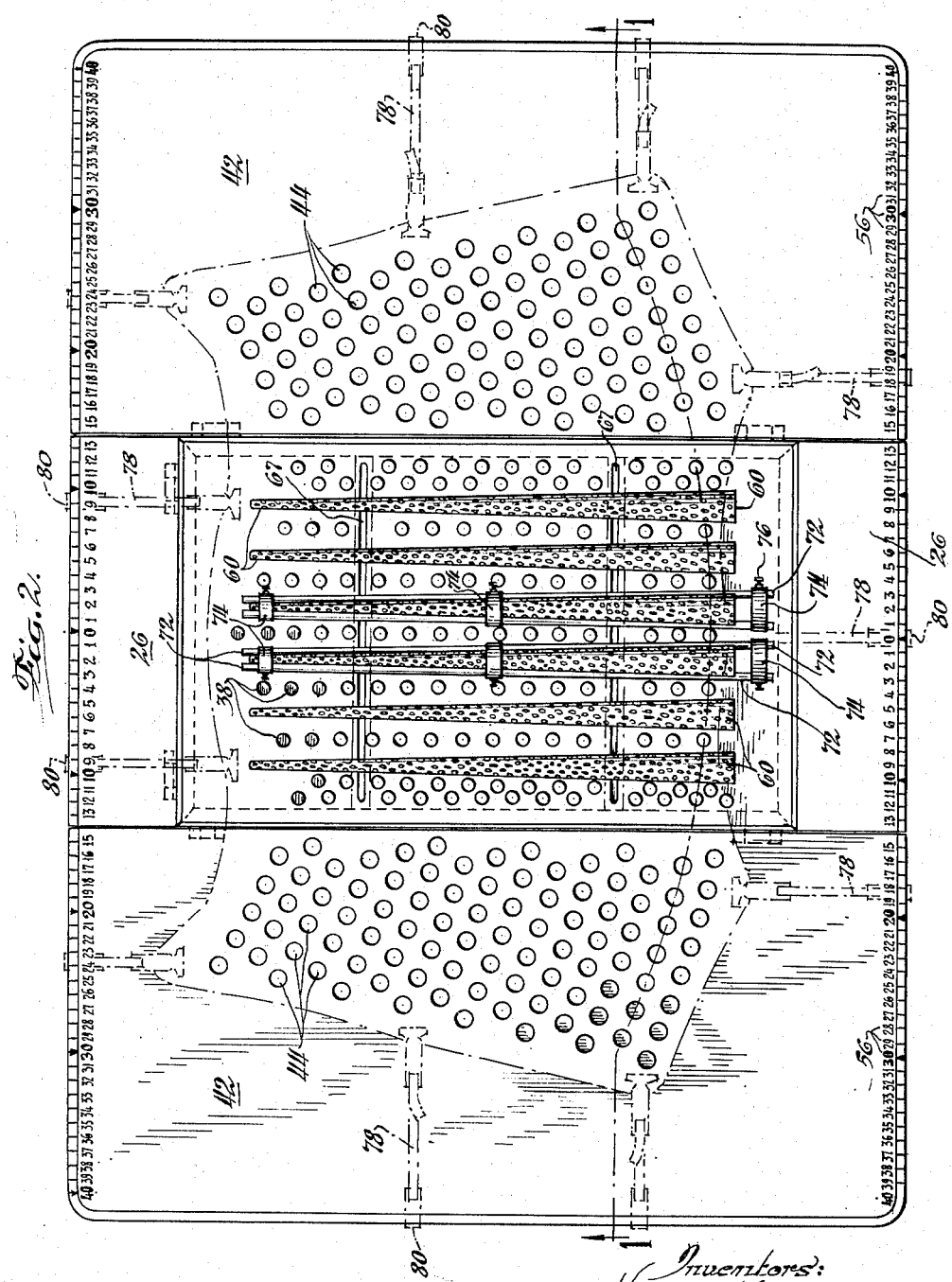

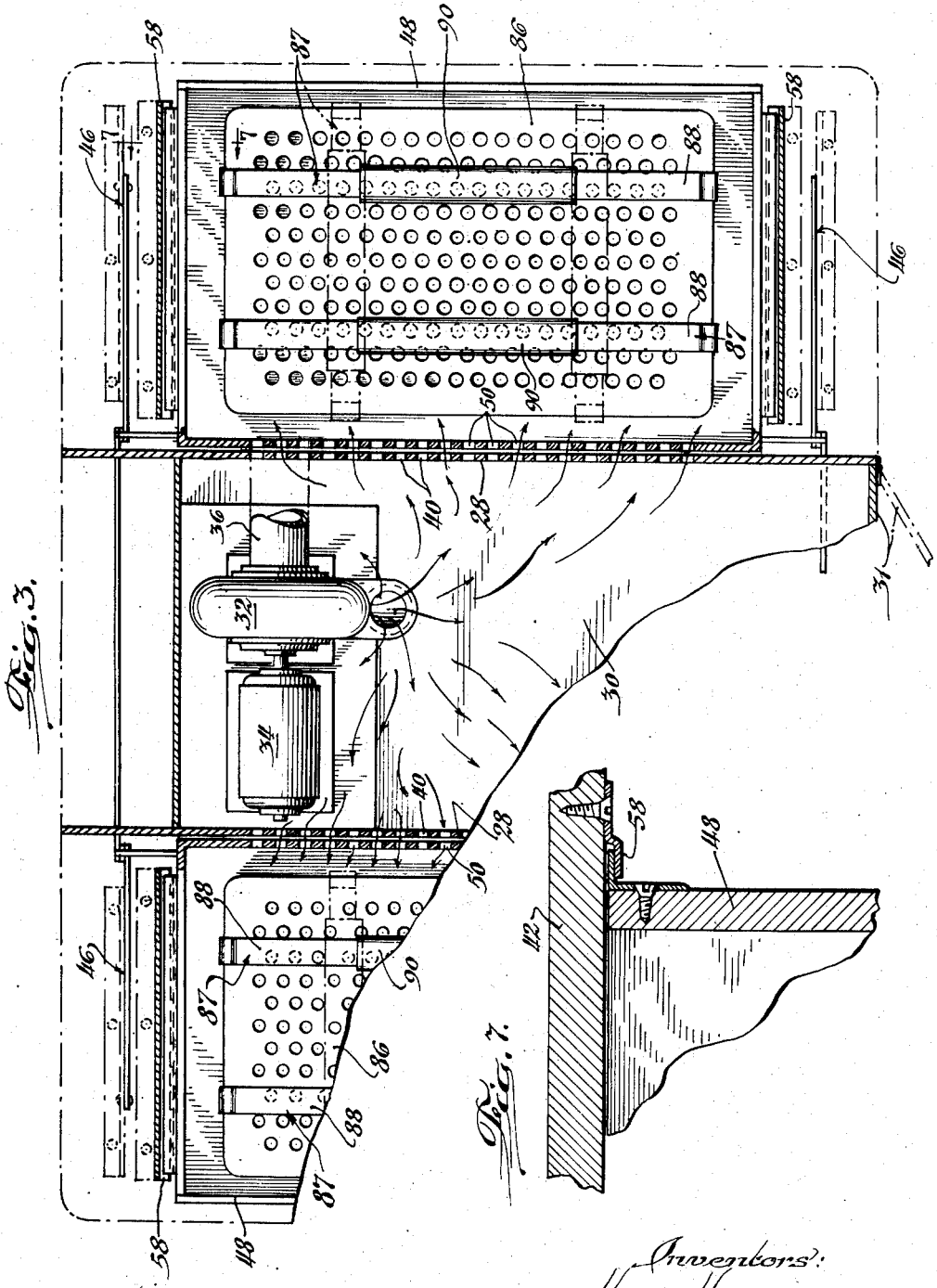

Patented Aug. 26, 1952

2,608,322

UNITED STATES PATENT OFFICE 2,608,322

FUR SHAPING TABLE

Hans Hansen, Chicago, and Frank X. Velten, Oak Lawn, Ill.

Application November 9, 1950, Serial No. 194,886

7 Claims. (Cl. 223—28)

The present invention relates to a fur shaping table.

In the past fur garments have been manufactured by locally stitching together a number of pieces both large and small of animal skins into three principal separate pieces. That is skins have been assembled to form the back of the garment and separate pieces have also been formed which are to become the two front halves.

These individual fur pieces are then dampened and stretched with the skin side up so as to give the piece its final shape and to remove wrinkles which otherwise would be present because of the impossibility of perfectly assembling a number of small pieces of animal skins under even tension. The stretching is accomplished by nailing the damp fur pieces to boards, the nails being closely spaced all around the periphery and then setting the nailed skins aside to dry for at least a day. After the skins are removed they will hold their shape and the three pieces may then be stitched together. In order to provide local fullness in the garment, kyles are sometimes formed locally so as to provide small areas where the skin is stretched beyond what can be accomplished by flat stretching. Kyles usually are formed by tacking the skin around small wooden wedges or the like and may be formed when the skins are originally tacked to the board although they are sometimes formed later.

The above general process of manufacturing fur garments provides for fullness in the garment in certain areas but the specific shaping of these fuller portions has not, to our knowledge, been before accomplished in a satisfactory manner. For instance, the back of a fur coat may be made full but so far as we know this fullness has never been given any particular shape. The garment is therefore esthetically less satisfactory than if it could be, for instance, formed to have four to six soft rather long deep pleats.

It is one of the objects of the present invention to provide a novel fur stretching table or the like which greatly simplifies the operation of stretching the fur pieces to final shape and which enables the formation of pleats extending the full length of the back of the garment in an easy and satisfactory manner.

Yet another object is to enable the entire body portion of the coat comprising the back and both front panels to be shaped as a single unit to exact dimensions.

Yet another object is to provide the above in a table which, in addition, enables the body portion of the garment to be shaped with the fur side up where the effect of the shaping operation may be better judged.

Still another object is to provide an arrangement and a method for shaping fur garments which requires far less labor than conventional methods and which enables the entire operation to be conducted in a matter of a few hours including the drying time.

Still another object is to provide a table or machine for accomplishing the above which is readily adaptable to accommodate garments of different size and shape.

Still another object is to provide a satisfactory and novel method for quickly shaping the back portion of a fur garment into a desired number of longitudinally extending pleats.

Yet another object is to provide all of the above and in addition provide means for shaping and simultaneously drying small fur pieces which are used in constructing a fur garment.

Yet another object is to provide a table for accomplishing all of the above which may be easily collapsible when not in use so that it will occupy less space.

Other objects and advantages will become apparent from the following description of a preferred embodiment of our invention which is illustrated in the accompanying drawings. In the drawings in which similar characters of reference refer to similar parts throughout the several views:

Fig. 1 is a vertical longitudinal sectional view through a fur shaping table embodying the present invention. It may be considered as taken in the direction of the arrows substantially along the line 1—1 of Fig. 2;

Fig. 2 is a top view of the table;

Fig. 3 is a horizontal sectional view just beneath the top of the table and may be considered as taken in the direction of the arrows along the line 3—3 of Fig. 1;

Fig. 4 is a vertical transverse sectional view showing one of the adjustable pleat forming elements in use on the table. It may be considered as taken in the direction of the arrows along the line 4—4 of Fig. 1;

Fig. 5 is a sectional view at right angles to that of Fig. 4 and may be considered as taken in the direction of the arrows along the line 5—5 of Fig. 4;

Fig. 6 is a view similar to Fig. 5 but shows an alternative position of certain of the elements;

Fig. 7 is a fragmentary vertical sectional view showing a detail of construction and may be considered as taken in the direction of the arrows substantially along the line 7—7 of Fig. 3;

Fig. 8 is a fragmentary vertical sectional view and may be considered as taken in the direction of the arrows substantially along the line 8—8 of Fig. 1;

Fig. 9 is a perspective view of a pair of clamping bars used in shaping the fur; and Fig. 10 is a perspective view of a clamp used to facilitate positioning and drying small fur pieces which may be under treatment at the same time as the large fur piece which comprises the body of the garment.

The device of the present invention is constructed in the form of a table having steel upright members or legs 20 at the four corners. Casters 22 may be attached to the lower ends of these legs so as to facilitate movement of the device. The legs 20 are braced by horizontal members 24 which are also formed in the present instance of structural steel shapes so as to form a strong rugged table. The top of this table is preferably formed of wood and is shown at 26. Beneath the top 26 a boxlike structure 28 is formed which encloses both the sides and the ends of the table and this boxlike structure is also fitted with a bottom 30 such that with the exception of the openings to be described presently, the box and table top form essentially a closed rectangular container. The side walls 28 and bottom member 30 may be formed of metal or plywood or any suitable material. Preferably the front 31 is formed as an outwardly swinging door to give access to the interior. The floor 30 of this box carries a centrifugal blower 32 driven by an electric motor 34. The blower is so connected that a pipe or conduit 36 from its inlet extends through one of the side walls of the box 28 so that air is drawn into the blower 32 from the outside and is exhausted directly into the box. A number of perforations 38 are drilled through the top of the table and the upper portions of the side walls 28 similarly are provided with perforations 40 for a purpose to be described presently.

At each side of the table the top member 26 carries a hinged leaf 42 which extends outwardly therefrom so as to give the entire table top an area approximately three times that of the central portion represented by the member 26. These leaves 42 similarly are formed of wood and have perforations 44 extending therethrough over a large portion of their area, particularly the portion of the leaves toward the central top member 26. These leaves are adapted to fold downwardly into an approximately vertical position along the sides of the table so that the table will occupy less space when it is not in use. When in use they are supported in a horizontal position by oblique bracing members 46 which extend generally downwardly from the leaves to the main frame of the table.

Each of these leaves is provided with a drawer 48 which slides in rails 50 as best seen in Fig. 7. These drawers when slid into position beneath the leaves 42 form a comparatively close fit therewith so that not much air will leak out where the top edges of the drawers are beneath the table leaves 42. These drawers slide in an endwise direction, that is toward and away from the central unit and the back walls of these drawers are formed with perforations 50 which are in alignment with the perforations 40 in the side walls of the main boxlike container 28. When the drawers are pushed all the way in they are retained in this position by a spring loaded ball 52 recessed in the under surface of the table leaves 42 which snaps into a depression 54 in the top edge of the drawer ends 48. If desired, in order to facilitate use of the drawers in a manner to be suggested presently, the fronts of the drawers may be hinged to the bottoms thereof so that as shown in Fig. 1 they may be pulled outwardly and lowered to the position shown in phantom lines. The drawers are, of course, removed before the leaves are lowered when the table is not to be used for a while.

From the above it will be seen that when the drawers are pushed all the way in so that the fronts are retained by the ball latches 52 and the motor 34 is placed in operation, air will be drawn inwardly through the conduit 36 from outside the container 28 and will be exhausted into this container. From the container it flows upwardly through the openings 38 in the top surface of a central portion of the table and also through the openings 40 and 50 into the drawers 48 so as to circulate through these containers and thence upwardly from the drawers through the openings 44 in the top surface of the table leaves and back to the atmosphere.

Preferably the side edges of the table top including the leaves are marked off in inches from the center of the table, as indicated at 56 in Fig. 2. These markings facilitate the operation of shaping the fur piece although they may be considered as a design refinement, it being appreciated that a measuring tape will serve although its use will be somewhat more time consuming.

The table top 26 of the central portion is formed preferably as a loose member which can be lifted from the table so as to give access to its under surface. In other words, it simply rests in channel members 58 formed at the top of the table. This construction as well as use of the door 31 gives access to the motor and blower at the interior of the box 28 and also facilitates adjustment of the pleat forming elements indicated generally by the numeral 60.

These elements extend longitudinally over a large portion of the area of the central table top 26 from the front toward the back. Each one is formed of perforated sheet metal and has generally the contour indicated in Figs. 4, 5 and 6. The perforated strips are formed in such manner that in transverse section they are generally of inverted U-shape with their two edges slightly closer together than the broadest portion thereof. In other words, although the exact shape is largely a matter of choice, these elements, indicated by the numeral 62, in transverse section may be considered as having a top surface which is generally slightly more than semi-circular joined to straight downwardly extending edges which at their lower limits are welded, brazed, or otherwise suitably secured to an inverted steel channel strip 64 which runs longitudinally centrally beneath the top surface of the U-shaped member 62. These stretching members 60 are also tapered so that they are broader and higher at one end than at the other. If the bottom of Fig. 2 is considered as the front of the device, the stretching element 60 will be found to be higher and wider at this end and taper downwardly until at their opposite ends they are quite small. Although in a manner to be described presently a single set of these shaping elements may be adjusted to give a considerable variety of effect, it will be apparent that if desired several sets of elements 60 may be provided, these sets having different overall lengths and perhaps different widths and other variations in contour.

The stretching elements 60 are clamped to the table top 26 by a pair of wing bolts 66 which extend upwardly through parallel side-to-side slots 67 in the table top and into nuts 68 above the channel strips 64, these channels being slotted longitudinally as at 69 to pass the bolts 66. When the bolts 66 are loose therefore the stretching elements 60 can be pushed into whatever fore and aft or side-to-side relationship is desired on the table top before the bolts 66 are tightened to retain them in position. In Figs. 1 and 2, six of these elements are shown in side-by-side relationship. Under some circumstances fewer than this number will be used although as a rule six is enough to take care of the maximum requirements. Normally the shape of the elements 60, that is particularly their taper from front to back, is sufficient to give pleats of the desired contour. If the pleating effect is desired to be more pronounced this can be achieved by pushing simple wedges 70, as shown in Figs. 4 and 5, into position beneath the channels 64 before the bolts 66 are tightened so as to raise the elements 60 at one end. Figs. 5 and 6 show the comparative relationship of the top 26 and stretching elements 60 with and without the use of wedges.

Skins to be shaped are retained in place over the stretching and shaping elements 60 by a pair of parallel bars 72 which extend lengthwise along the shaping members 60 and closely adjacent to the table top 26. These parallel bars are connected to the lower ends of two or more generally U-shaped spring bows 74 which tend to urge the bars 72 together. This tendency is reinforced by adjustment screws 76 which extend horizontally across the spring bows somewhat below their upper limits. The screw 76 passes through an opening at one side of the bow and at its other end is threaded into the opposite side so that by tightening the screws 76 the bows are sprung inwardly and the bars 72 pressed more tightly together. The vertical distance between the bars 72 and the adjustment screws 76 is such that when the bars are in place against the table top, the screws 76 clear the tops of the shaping elements 60 by a substantial margin.

Supplied with each table and considered as a part thereof are a plurality of stretching straps 78 formed of leather or webbing which have metal clips 80 attached at one end. These clips are shaped to fit over any of the edges of the table top so that a pull inwardly on the strap 78 toward the center of the table will be resisted by the edge of the table top. The clips 80 may, of course, be slid along the edge of the table so as to bring the strap 78 to any desired position. The opposite end of the strap 78 passes through an ordinary length adjusting buckle 82 of any suitable sort formed at one end of a spring actuated metal clamp 84 which may be of any desired design, it being adapted merely for quick manual securement to the edge of a skin to be stretched and shaped. Thus by taking the clamp 84 in hand and securing it to the edge of the skin to be shaped and then hooking the clip 80 over the edge of the table, and pulling upon the free end of the strap, the edge of the skin attached to the clip 84 is drawn toward the edge of the table a desired amount, after which releasing the free end of the strap retains the skin periphery in this position.

The skin to be stretched and shaped is treated in the following manner: First it is dampened so as to soften it, after which it is laid with the fur side up upon the top of the table over the shaping elements 60. A number of clamps 84 are then attached around the periphery with the clips 80 hooked over the table edge. By the use of lines drawn upon the table or of tapes stretched across the top from a predetermined number 56 upon one side to a known number upon the other side, or simply in a free hand manner, if the operator is sufficiently skilled, the straps are tightened so as to stretch the skin to the desired dimensions and contour. The parallel bars 72 are then sprung apart a slight amount and these bars are dropped over the portion of the skin where it lies above the stretching elements 60. The bars, because of their weight, carry the skin into contact with the table and if necessary the screws 76 may be tightened to secure the skin in this position. The central portion of the fur panel therefore is formed into a plurality of sinuous convolutions which shape the back portion of the coat into parallel tapered pleats extending from top to bottom.

After the clamping bars 72 have been adjusted to the operator's satisfaction, more clamps 84 may be secured to the edge of the skin until these clamps are quite close together so as to prevent the edge of the skin from having a wavy appearance. If after these clamps have been attached the skin is found to be somewhat below the desired dimensions, it will be apparent that by walking around the table and tugging slightly at the free ends of the straps 82 in succession the skin may gradually be placed under greater tension in all directions until it is stretched to the desired size. This operation, although it has proved to be extremely rapid and simple, is one that cannot effectively be accomplished by the conventional nailing method since it would require removing many nails and moving them outwardly progressively to new positions.

After all of the clamps have been adjusted to give the skin the desired contour and the clamping bars 72 are all pressing the skin firmly around and into contact with the shaping members 60, the motor 34 is started. This causes air to be drawn into the box 28 and exhausted upwardly against the entire lower surface of the skin under treatment. The result is that the moisture is rapidly removed even though the skin has been positioned against the table with the fur side up, thus obviating the necessity of drying the skin in an upsidedown position as has previously been practiced, under which conditions the final appearance of the fur side must necessarily be somewhat estimated since it cannot be seen.

Because of the rapid circulation of air, the skin will quickly dry and may soon be removed from the table for attachment of the lining and accessory pieces.

Accessory pieces such, for instance, as sleeves, cuffs and the like, usually are relatively easy to handle by the conventional nailing method and may, if desired, be nailed to small boards shown at 86 in Fig. 1. These boards are of such size that they may be inserted in the drawers 48 with the fur pieces secured thereto. The drawers are then closed and it will be apparent that these accessory pieces will therefore be dried simultaneously with the drying of the main portion of the garment. Preferably in order to promote good circulation of air around the small pieces the boards 86 are perforated and are spaced apart by brackets 87 such as those shown in Fig. 10. These brackets are formed of two lengths of steel strip 88 which are overlapped at the center where they are embraced by a sleeve 90 so that they may be pushed together or pulled apart to adjust their length. The ends of the strips 88 are bent downwardly slightly as at 92 and then are bent into U-shape, as indicated at 94, to embrace the edges of the boards 86. If desired the ends of these U-shaped members 94 may be threaded to receive wing screws 96 so that they may be clamped securely. Their use upon the boards in spacing them apart is best seen in Fig. 1.

While we have shown and described a preferred embodiment of our invention, it will be apparent that numerous variations and modifications thereof may be made without departing from the underlying principles of the invention. We, therefore, desire, by the following claims, to include within the scope of the invention all such variations and modifications by which substantially the results of our invention may be obtained through the use of substantially the same or equivalent means.

We claim:

1. A fur shaping device comprising means forming a table top with supporting means therefor, said table top having a surface area larger than that of a fur garment to be treated, said top being formed to provide perforations extending therethrough from the upper surface to the lower surface thereof, air circulating means for forcing air upwardly through said perforations, a plurality of clamping elements adapted for ready attachment to the edge of a fur piece to be treated, a plurality of clips adapted for engagement over the edge of said table top, adjustable tensioning members connecting said clamps to said clips whereby the edge of the clamped fur piece can be stretched outwardly by shortening the distance between said clips, a plurality of pleat forming members, adjustable means for securing said pleat forming members to said table top in desired relationship thereon, each of said pleat forming members being long and thin and generally U-shaped in cross section and tapering from end to end, said pleat forming members being perforated to permit air received from the perforations in the table top to circulate therethrough and into contact with the fur piece being treated, and clamping members adapted to be placed over said pleat forming members for holding fur pieces under treatment into engagement with substantially the entire surface of said pleat forming members.

2. A fur shaping device comprising means forming a table top with supporting means therefor, said table top having a surface area larger than that of a fur garment to be treated, said top being formed to provide perforations extending therethrough from the upper surface to the lower surface thereof, means forming an enclosure below said table top communicating with said perforations, air circulating means for forcing air into said enclosure and thence upwardly through said perforations, a plurality of clamping elements adapted for ready attachment to the edge of a fur piece to be treated, a plurality of clips adapted for engagement over the edge of said table top, adjustable tensioning members connecting said clamps to said clips whereby the edge of the clamped fur piece can be stretched outwardly by shortening the distance between said clips, a plurality of pleat forming members, adjustable means for securing said pleat forming members to said table top in desired relationship thereon, each of said pleat forming members being long and thin and generally U-shaped in cross section and tapering from end to end, said pleat forming members being perforated to permit air received from the perforations in the table top to circulate therethough and into contact with the fur piece being treated, clamping members adapted to be placed over said pleat forming members for holding fur pieces under treatment into engagement with substantially the entire surface of said pleat forming members, a drawer mounted to slide beneath said table top into a position therebeneath and against said enclosure, said drawer lying beneath some of the perforations in said table top, and said drawer and said enclosure being formed with substantially aligned openings so that air can flow from said enclosure to said drawer and thence through said table top.

3. A fur shaping device comprising means forming a table top, said table top having a surface area larger than that of a fur garment to be treated, said top being formed to provide perforations extending therethrough from the upper surface to the lower surface thereof, air circulating means for forcing air through said perforations, a plurality of pleat forming members, adjustable means for securing said pleat forming members to said table top in desired relationship thereon, each of said pleat forming members being long and thin and generally U-shaped in cross section and tapering from end to end, said pleat forming members being perforated to permit air received from the perforations in the table top to circulate therethrough and into contact with the fur piece being treated, and clamping members adapted to be placed over said pleat forming members for holding fur pieces under treatment into engagement with substantially the entire surface of said pleat forming members.

4. A fur shaping device comprising means forming a table top, said table top having a surface area larger than that of a fur garment to be treated, said top being formed to provide perforations extending therethrough from the upper surface to the lower surface thereof, means forming an enclosure below said table top communicating with said perforations, air circulating means for forcing air into said enclosure and thence upwardly through said perforations, a plurality of pleat forming members, adjustable means for securing said pleat forming members to said table top in desired relationship thereon, each of said pleat forming members being long and thin and generally U-shaped in cross section and tapering from end to end, said pleat forming members being perforated to permit air received from the perforations in the table top to circulate therethrough and into contact with the fur piece being treated, and clamping members adapted to be placed over said pleat forming members for holding fur pieces under treatment into engagement with substantially the entire surface of said forming members.

5. The method of shaping the entire body portion of a fur garment sewed into a single fur piece which comprises dampening the fur piece so as to render the hide thereof soft and pliable, positioning the fur piece with the fur side up upon a substantially plane surface having an area larger than that of the fur piece, placing corrugated shaping members in substantially parallel relationship beneath the back portion of the fur piece, said corrugated members extending longitudinally over the major distance between the top and bottom of the back portion of said fur piece, grasping the fur piece at its edges and stretching it to a desired contour, clamping the fur piece into close contact with said corrugated members, and passing ventilating air under pressure between the substantially plane surface and the corrugated members on the one hand and the fur piece on the other hand to promote drying of the fur piece.

6. A fur shaping device comprising means forming a table top, said table top having a surface area larger than that of a fur piece to be treated, said top being formed to provide a multiplicity of air outlet openings in its upper surface, air circulating means for forcing air outwardly through said openings, a plurality of elongated pleat forming members, adjustable means for securing said pleat forming members to said table top in spaced relationship thereon, each of said pleat forming members being hollow and open at the surface in contact with said table and positioned over at least a portion of said openings to receive air therefrom, said pleat forming members being perforated to permit air received from the openings in the table top to circulate therethrough and into contact with the fur piece being treated, and means for holding the fur piece onto the surface of said table top between said members and in intimate contact with the outer surfaces of said pleat forming members.

7. A fur shaping device comprising means forming a table top, said table top having a surface area larger than that of a fur piece to be treated, said top having air passages therein terminating in a multiplicity of air outlet openings in the upper surface thereof, air circulating means for supplying air to said passages and forcing it outwardly through said openings, a plurality of pleat forming members, adjustable means for securing said pleat forming members to said table top in desired relationship thereon, each of said pleat forming members being hollow and open at the surface in contact with said table and positioned over at least a portion of said openings to receive air therefrom, said pleat forming members being perforated to permit air received from the openings in the table top to circulate therethrough and into contact with the fur piece being treated, and means for holding the fur piece against surfaces of said pleat forming members so that pleats will be formed therein as the fur piece is treated.

HANS HANSEN.
FRANK X. VELTEN.

REFERENCES CITED

The following references are of record in the file of this patent:

UNITED STATES PATENTS

| Number | Name | Date |
|---|---|---|
| 1,618,562 | Wendt | Feb. 22, 1927 |
| 1,692,716 | Alter et al. | Nov. 20, 1928 |
| 1,925,094 | Greenstein | Sept. 5, 1933 |
| 2,243,396 | Schultz | May 27, 1941 |
| 2,423,391 | Kozloff | July 1, 1947 |